(12) United States Patent
Fauver et al.

(10) Patent No.: US 12,484,885 B2
(45) Date of Patent: Dec. 2, 2025

(54) SYSTEM, DEVICE, AND METHOD FOR BIOPSY REMOVAL FROM NEEDLES INTO A FLUIDIC DEVICE

(71) Applicant: University of Washington, Seattle, WA (US)

(72) Inventors: Mark E. Fauver, Seattle, WA (US); Eric J. Seibel, Seattle, WA (US)

(73) Assignee: University of Washington, Seattle, WA (US)

( * ) Notice: Subject to any disclaimer, the term of this patent is extended or adjusted under 35 U.S.C. 154(b) by 833 days.

(21) Appl. No.: 17/755,808

(22) PCT Filed: Nov. 23, 2020

(86) PCT No.: PCT/US2020/061728
§ 371 (c)(1),
(2) Date: May 9, 2022

(87) PCT Pub. No.: WO2021/102397
PCT Pub. Date: May 27, 2021

(65) Prior Publication Data
US 2022/0395263 A1    Dec. 15, 2022

Related U.S. Application Data

(60) Provisional application No. 62/938,696, filed on Nov. 21, 2019.

(51) Int. Cl.
*A61B 10/02*    (2006.01)
*A61B 10/00*    (2006.01)
*B01L 3/00*    (2006.01)

(52) U.S. Cl.
CPC ...... *A61B 10/0233* (2013.01); *A61B 10/0096* (2013.01); *B01L 3/502738* (2013.01)

(58) Field of Classification Search
CPC ............ A61B 10/0233; A61B 10/0096; B01L 3/502738; G01N 1/38
See application file for complete search history.

(56) References Cited

U.S. PATENT DOCUMENTS

| 3,375,842 | A | 4/1968 | Reader |
| 4,662,829 | A | 5/1987 | Nehring |

(Continued)

FOREIGN PATENT DOCUMENTS

| EP | 1698283 B1 | 3/2006 |
| JP | 5082049 B2 | 11/2012 |

(Continued)

OTHER PUBLICATIONS

International Search Report for corresponding PCT application No. PCT/US2020/061728, dated Jan. 25, 2021.

(Continued)

*Primary Examiner* — Jennifer Wecker
*Assistant Examiner* — Steven Ray Castaneda
(74) *Attorney, Agent, or Firm* — McDonnell Boehnen Hulbert & Berghoff LLP

(57) ABSTRACT

The present disclosure provides a fluidic device including a first inlet, an outlet, and a channel positioned between the first inlet and the outlet. The channel is in fluid communication with the first inlet and the outlet. The fluidic device further includes a second inlet positioned between the first inlet and the outlet. The second inlet is in fluid communication with the channel. The fluidic device further includes a pump in fluid communication with the second inlet. The pump is configured to provide a first volume of pulsatile flow to the channel. The first volume of pulsatile flow is greater than about 50 μL per pulse.

20 Claims, 12 Drawing Sheets

(56) References Cited

U.S. PATENT DOCUMENTS

| | | |
|---|---|---|
| 5,224,488 A | 7/1993 | Neuffer |
| 5,810,744 A | 9/1998 | Chu |
| 5,817,032 A | 10/1998 | Williamson |
| 5,980,468 A | 11/1999 | Zimmon |
| 6,592,530 B1 | 7/2003 | Farhadi |
| 7,572,236 B2 | 8/2009 | Quick |
| 8,002,713 B2 | 8/2011 | Heske |
| 9,820,480 B2 | 11/2017 | Mark |
| 10,292,721 B2 | 5/2019 | Guggenheimer |
| 2003/0054545 A1 | 3/2003 | Janigro |
| 2004/0238052 A1* | 12/2004 | Karp .............. B01J 19/0093 137/822 |
| 2005/0085721 A1* | 4/2005 | Fauver ............ G02B 21/002 600/425 |
| 2008/0028594 A1* | 2/2008 | Lafont ............ A61F 2/95 29/516 |
| 2012/0034695 A1 | 2/2012 | Sethu |
| 2012/0177543 A1* | 7/2012 | Battrell .......... F04B 43/043 422/187 |
| 2016/0106903 A1 | 4/2016 | Nilsson et al. |
| 2016/0220990 A1* | 8/2016 | Seibel ............ G01N 33/4833 |
| 2021/0003384 A1* | 1/2021 | Zysk ............. G01N 21/45 |

FOREIGN PATENT DOCUMENTS

| | | |
|---|---|---|
| WO | 2013192606 A1 | 12/2013 |
| WO | 2019090290 A1 | 5/2019 |

OTHER PUBLICATIONS

Uhl et al., "Percutaneous Bone Biopsy: Experimental Study comparing Bone Biopsy Systems", Z Orthop accident; 147(3):327-333 (2009).

Wolinski et al., "Comparison of diagnostic yield of core-needle and fine-needle aspiration biopsies of thyroid lesions: Systematic review and meta-analysis", Eur Radiol., 27:431-436 (2017).

Basik et al., "Biopsies: next-generation biospecimens for tailoring therapy", Nat Rev clin Oncol. 10(8):437-50 (2013).

Das et al., "Pathology in a tube: Step 1. Fixing, staining, and transporting pancreatic core biopsies in microfluidic device for 3D imaging", Proceedings of SPIE, vol. 8976 (2014).

Fereidouni et al., "Microscopy with ultraviolet surface excitation for rapid slide-free histology", Nat. Biomed. Eng., 1 (12):957-966 (2017).

Tam et al., "Image-Guided Biopsy in the Era of Personalization Cancer Care: Proceedings from the Society of Interventional Radiology Research Consensus Panel", J. Vasc Interv Radiol, 27(1):8-19 (2016).

Ziv et al., "The Importance of Biopsy in the Era of Molecular Medicine", Cancer J., 22(6):418-422 (2016).

* cited by examiner

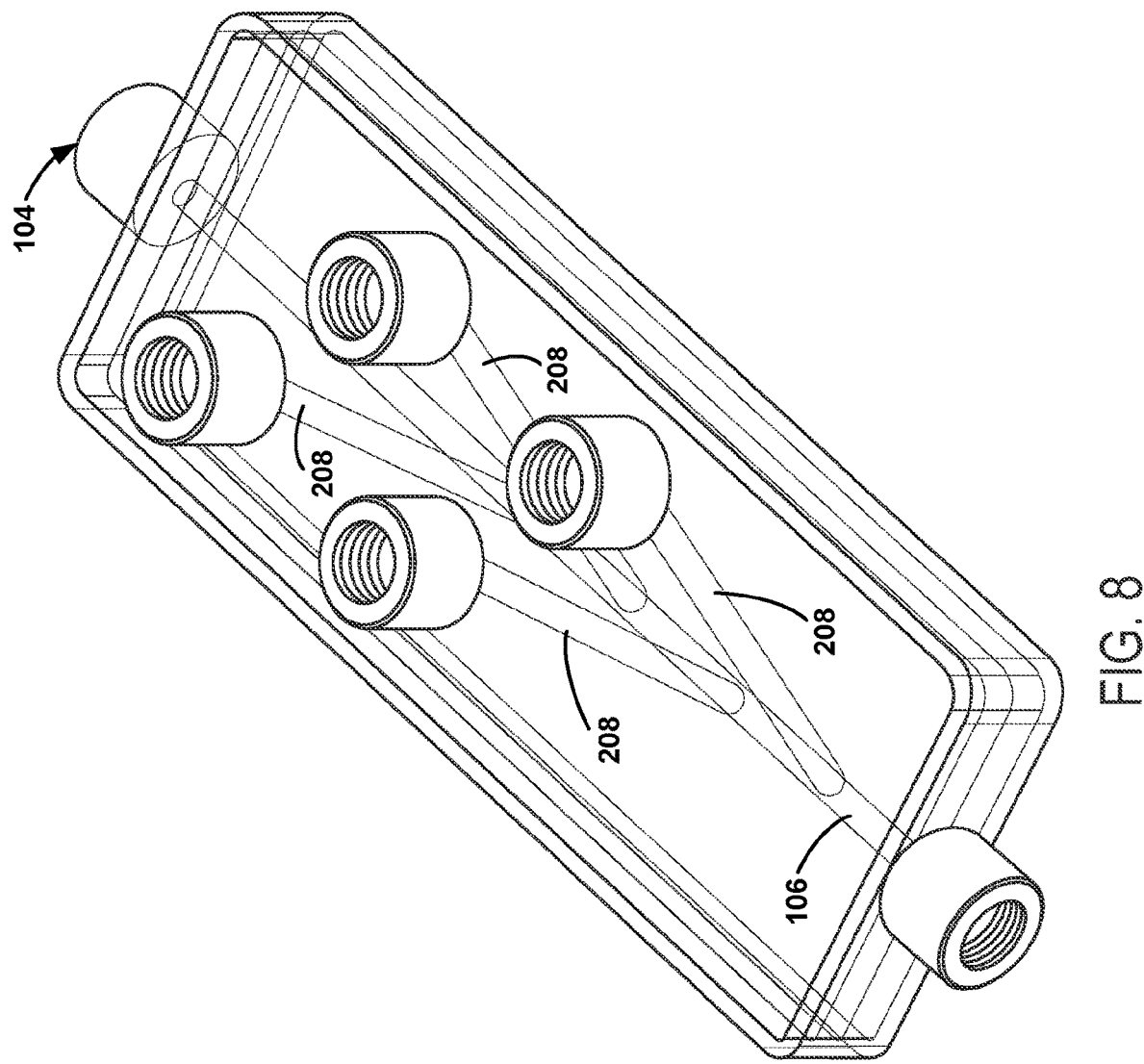

SYSTEM, DEVICE, AND METHOD FOR BIOPSY REMOVAL FROM NEEDLES INTO A FLUIDIC DEVICE

CROSS REFERENCE TO RELATED APPLICATION

This application is a U.S. National Phase application of, and claims the benefit of, International (PCT) Application No. PCT/US20/61728, filed Nov. 23, 2020, which claims priority to U.S. Provisional Application No. 62/938,696 filed Nov. 21, 2019, the contents of both of which are hereby incorporated by reference in their entirety.

BACKGROUND

Unless otherwise indicated herein, the materials described in this section are not prior art to the claims in this application and are not admitted to be prior art by inclusion in this section.

In the United States alone, millions of needle biopsies are procured every year from patients to diagnose organ disease, such as breast, lung, prostate, liver, pancreas, and kidney cancers. Additional biopsies are taken during surgery to determine if surgical removal is complete. Typically, determination of the presence of disease, such as presence of tumor detected from the biopsy, takes many hours or days after procurement from the body, where the biopsy is procured as is typical, by a needle. This prolonged time period between retrieval of the biopsy and analysis of the biopsy occurs because the sample preparation process for conventional histopathology requires several time-consuming steps and the subsequent reading by a pathologist using an optical microscope. Occasionally the patient needs to have a second biopsy or surgical procedure if there is not sufficient tissue sampled or removed with the first biopsy. There is a growing problem of running out of biopsy material due to the addition of in vitro diagnostics, in such fields as genomics, proteomics, etc., which require a sample from the biopsy specimen. Ideally the needle biopsy is assessed for adequacy at the point of care, but this procedure is made challenging because of the small size of the needle biopsy, its mechanical fragility and chemical instability, and the reliance of manual specimen preparation steps that are performed by trained personnel and often a specialized laboratory facility. Thus, additional needle biopsies are usually taken to ensure that there is sufficient biological material, such as tissue, which causes unnecessary pain and suffering by the patient and costs associated with the extra biopsy samples.

SUMMARY

Example fluidic devices, systems, and methods described herein accepts a core needle biopsy specimen directly from a needle, readying the biopsy in milli-fluidic channels in order to provide rapid feedback to the clinician about the viability of the biopsy, so that the correct number of biopsies are taken, thereby ensuring that not too much or too little living human tissue is taken from the patient. The present disclosure provides a fluidic device that rapidly and gently removes a needle biopsy from various types of procurement needles. By using flowing fluids, the biological specimen can be kept intact while being transported within the fluidic device for further processing steps and analyses. The system allows multiplexed operation, such that more than one needle biopsy can be removed and prepared for analysis using a single fluidic device.

Thus, in one aspect, a fluidic device is provided including (a) a first inlet, (b) an outlet, (c) a channel positioned between the first inlet and the outlet, wherein the channel is in fluid communication with the first inlet and the outlet, (d) a second inlet positioned between the first inlet and the outlet, wherein the second inlet is in fluid communication with the channel, and (e) a pump in fluid communication with the second inlet, wherein the pump is configured to provide a first volume of pulsatile flow to the channel, and wherein the first volume of pulsatile flow is greater than about 50 µL per pulse.

In a second aspect, a system is provided. The system may include (a) the fluidic device of the first aspect, (b) a third inlet positioned between the second inlet and the outlet, wherein the second inlet is in fluid communication with the channel, (c) a second outlet positioned between the first inlet and the outlet, and (d) an imaging device positioned adjacent to the channel between the first inlet and the outlet.

In a third aspect, a method is provided. The method may include (a) inserting a needle including a biological specimen into the first inlet of the fluidic device of the first aspect so that the needle is positioned at least partially in the channel, and (b) flowing a first volume of pulsatile flow into the channel via the second inlet to dislodge the biological specimen from the needle.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 8 illustrates a perspective view of a biopsy parking design for temporarily storing biological specimen, according to an example embodiment.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the Figures, can be arranged, substituted, combined, separated, and designed in a wide variety of different configurations, all of which are explicitly contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

As used herein, "coupled" means associated directly as well as indirectly. For example, a member A may be directly associated with a member B, or may be indirectly associated therewith, e.g., via another member C. It will be understood that not all relationships among the various disclosed elements are necessarily represented.

Figure 11:
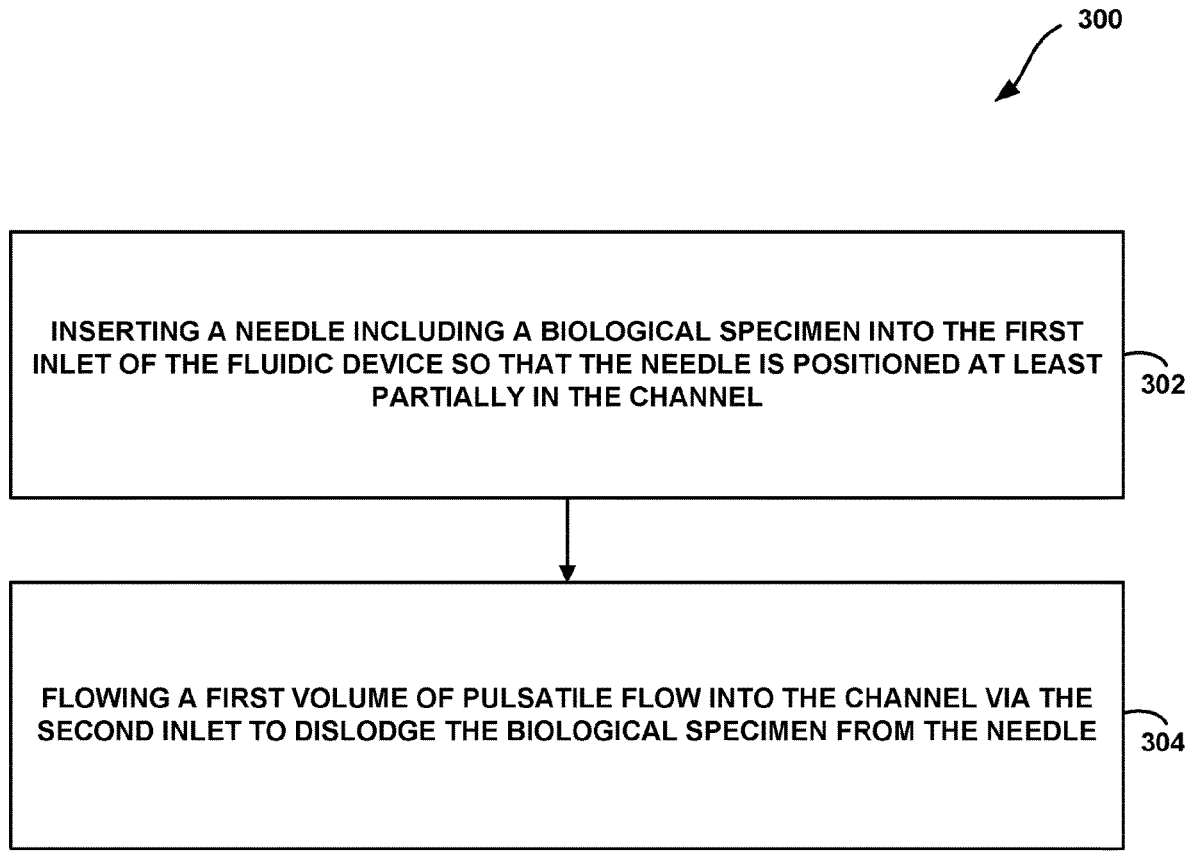
FIG. 11 is a flowchart illustrating an example method according to an example embodiment.

In FIG. 11, referred to above, the blocks may represent operations and/or portions thereof and lines connecting the various blocks do not imply any particular order or dependency of the operations or portions thereof. It will be understood that not all dependencies among the various disclosed operations are necessarily represented. FIG. 11 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" means +/−5%.

As used herein, with respect to measurements, "substantially" means +/−5%.

As used herein, the terms "biological specimen", "biological tissue sample", "biopsy", "biospecimen", and "core needle biopsy (CNB)" may be used interchangeably to mean a sample of biological tissue taken front a human or animal. The sample of biological tissue may constitute a biopsy, which can be a fine needle aspiration biopsy (FNA or FNAB), a core needle biopsy (CNB), or a surgical (open) biopsy.

Generally, embodiments of the fluidic device described herein accept a needle biopsy and automatically remove the biospecimen for adequacy testing. Additionally, the fluidic device prepares the specimen for downstream histopathology. The fluidic device is based on a millimeter-sized channel to accept the needle and provides controlled fluidic streams that gently and efficiently remove the long thin specimen and transport it within one or more milli-fluidic channels, such as is shown in the Figures and described in additional detail below. Using active fluidic pumping, such as high and low pulsatile flow rates, the procedure is automated and rapid. Fluid flows in milli-fluidic channels with and without a biopsy in aqueous solutions have intermediate Reynolds numbers, above the highly viscous flow and lower than highly inertial flows, typically below most turbulent conditions. Because the needle containing the biopsy is within the milli-fluidic device, the biospecimen is fully contained within the device during the entire separation process, removing the biopsy from the needle. With multiple channels for transporting and holding more than one needle biopsy, the gentle and rapid removal process can be repeated or multiplexed for multiple tissue removal processes within the same milli-fluidic device. This allows multiplexed needle biopsy analysis for adequacy and further diagnostic analyses which provides rapid feedback to the operator, while the clinician and patient are present.

Figure 1:
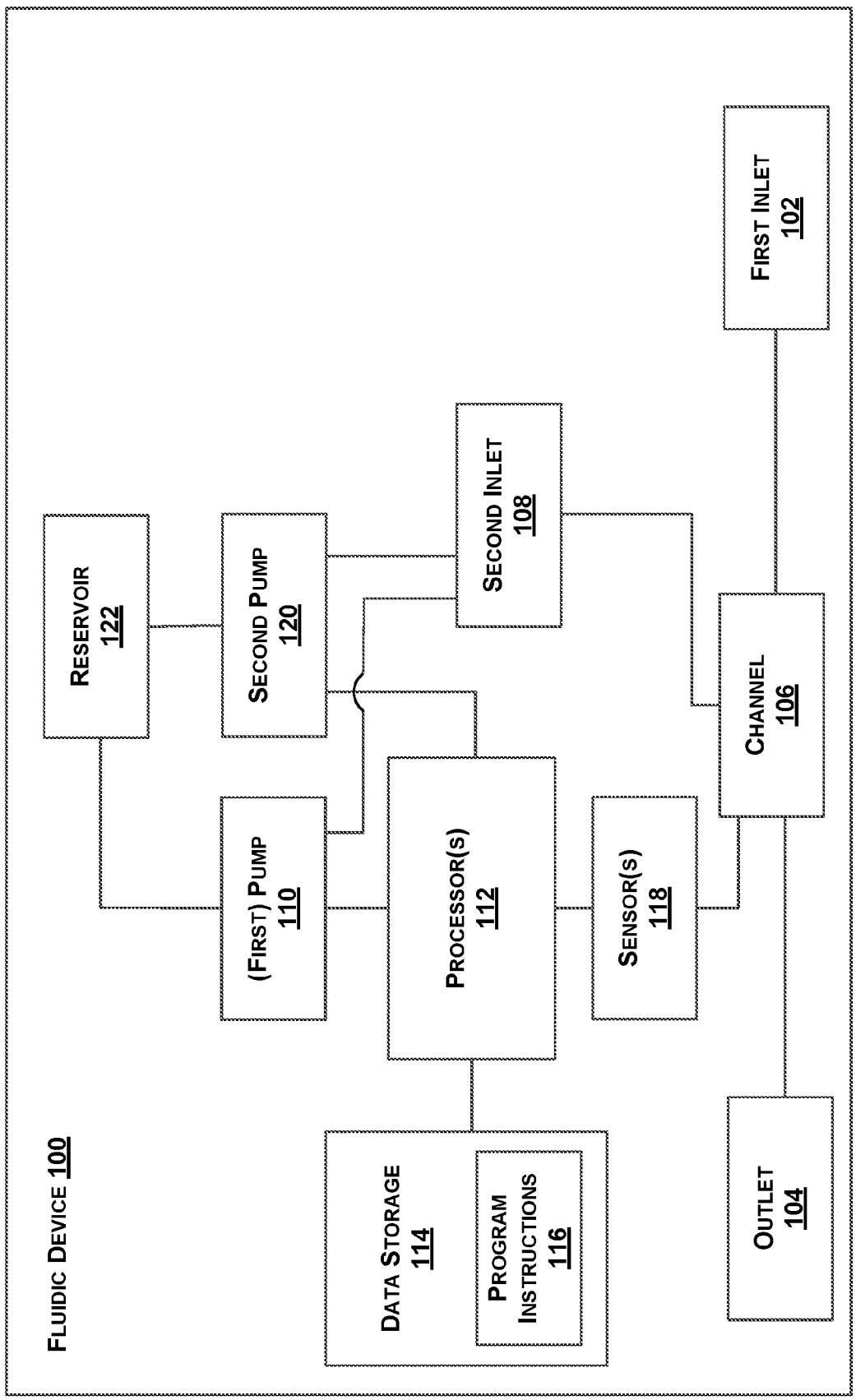
FIG. 1 illustrates a simplified block diagram of a fluidic device, according to an example embodiment.

With reference to the Figures, FIG. 1 illustrates a simplified block diagram of a fluidic device 100, according to an example embodiment. As shown in FIG. 1, the fluidic device 100 includes a first inlet 102, an outlet 104, and a channel 106 positioned between the first inlet 102 and the outlet 104. The channel 106 is in fluid communication with the first inlet 102 and the outlet 104. The fluidic device 100 further includes a second inlet 108 positioned between the first inlet 102 and the outlet 104. The second inlet 108 is in fluid communication with the channel 106. The fluidic device 100 further includes a pump 110 in fluid communication with the second inlet 108. The pump is 110 configured to provide a first volume of pulsatile flow to the channel 106. The first volume of pulsatile flow is greater than about 50 μL per pulse.

Figure 2:
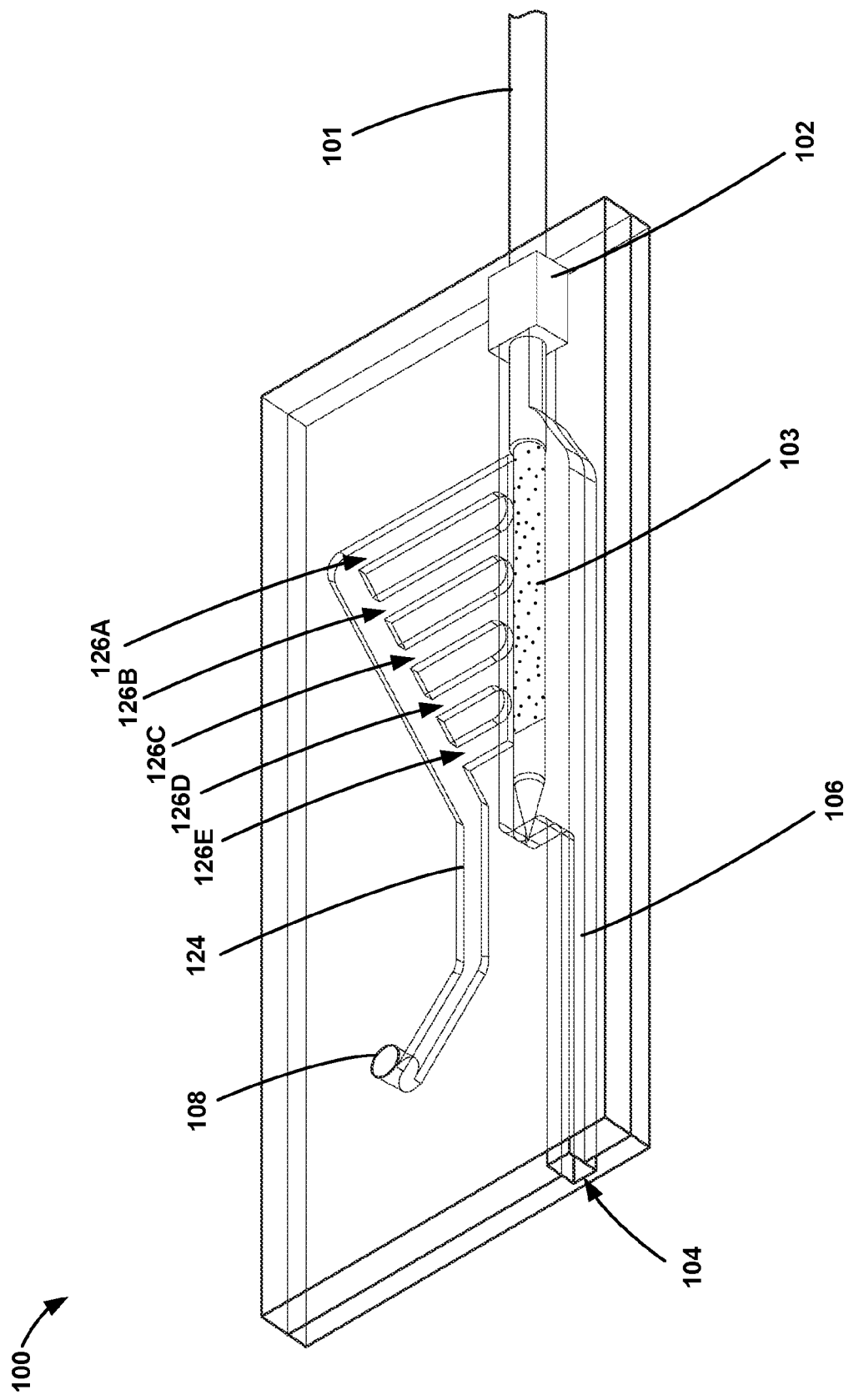
FIG. 2 illustrates a perspective view of a fluidic device, according to an example embodiment.
Figure 3B:
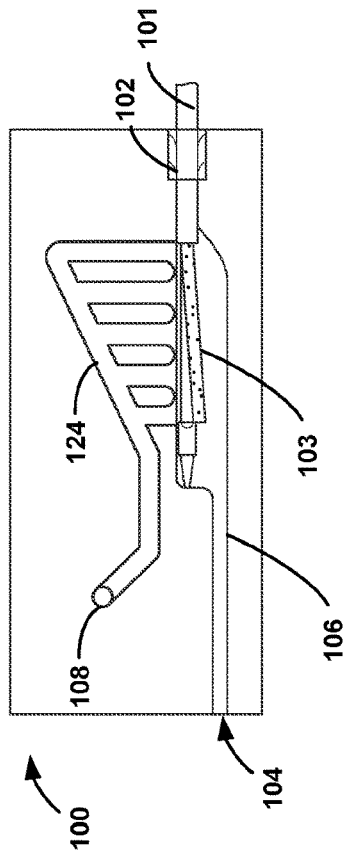
FIGS. 3A-3D illustrate a time series depiction of a removal of a biological specimen from a needle within the fluidic device of FIG. 2, according to an example embodiment.
Figure 3A:
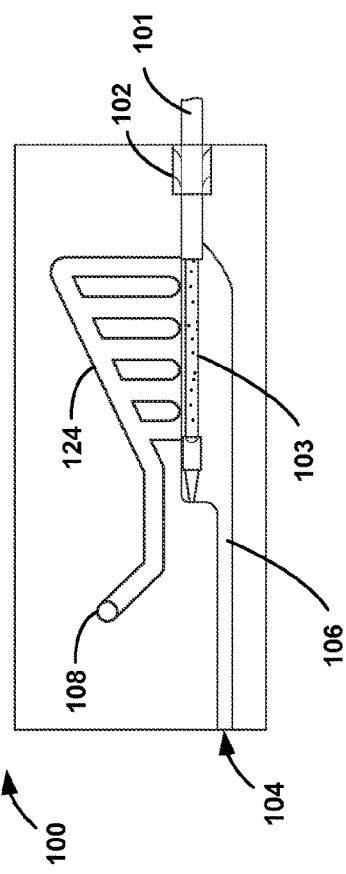
Figure 3D:
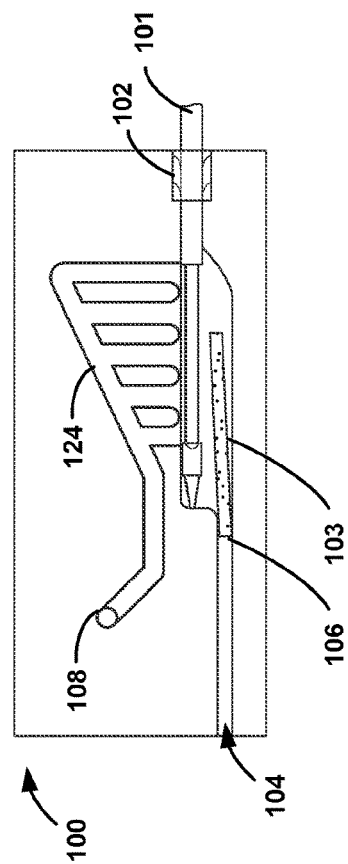
Figure 3C:
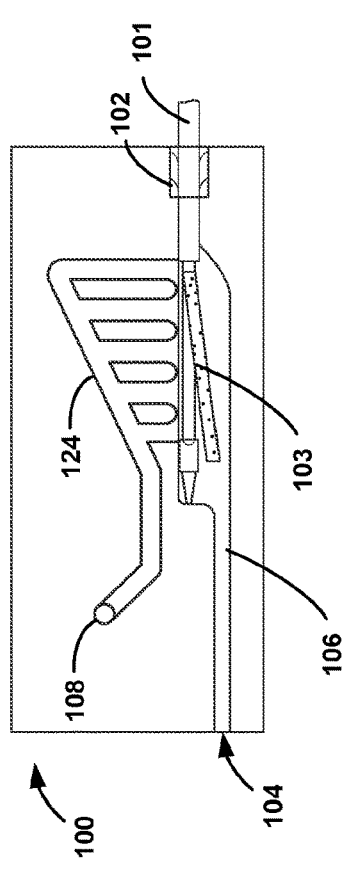

The first inlet 102 may provide a fluid-tight seal between an exterior of the fluidic device 100 and the channel 106. As such, the first inlet 102 may be configured to receive a needle 101 including a biological specimen 103 (as shown in FIG. 2). The sealing of the fluidic device 100 with the shaft of the needle 101 is an important initial step since the fluidic device 100 can be rapidly primed with solution once this fluidic seal is established. The fluid-tight seal around the needle 101 may be accomplished by an O-ring under compression from a low fluidic pressure fitting. In another example, fluid-tight seal around the needle 101 may be accomplished by a ferrule. Other fluid-tight seals between an exterior of the fluidic device 100 and the channel 106 to enable a needle 101 to be positioned therein are possible as well.

As shown in FIG. 1, the fluidic device 100 may further include at least one processor 112, and data storage 114 including program instructions 116 stored thereon that when executed by the at least one processor 112, cause the fluidic device 100 to perform functions. In one example, the functions include (i) providing a first volume of pulsatile flow to the channel 106. In use, the first volume of pulsatile flow may exceed about 50 μL per pulse, and may be used to dislodge a biological specimen 103 from a needle 101. In another example, the functions include (i) providing a first volume of pulsatile flow to the channel 106, (ii) determining that a biological specimen 103 has been dislodged from a needle 101 positioned at least partially in the channel 106, and (iii) in response to the determination, providing a second volume of pulsatile flow into the channel via the second inlet to transport the biological specimen 103 through the channel, where the first volume is greater than the second volume.

In one example, the fluidic device 100 may include further one or more sensors 118 configured to detect the presence of the biological specimen 103 in the channel 106. In one specific example, the one or more sensors 118 comprise optical switches. Other types of sensors are possible as well. In another example, the functions include (i) detecting a needle 101 within the channel 106, (ii) in response to detecting the needle 101, providing a first volume of pulsatile flow to the channel 106, (iii) determining that a biological specimen 103 has been dislodged from the needle 101, and (iv) in response to the determination that the biological specimen 103 has been dislodged, providing a second volume of pulsatile flow into the channel via the second inlet to transport the biological specimen 103 through the channel, where the first volume is greater than the second volume. In such an example, the one or more sensors may be configured to detect the presence of the needle 101 in the channel 106 and further be configured to detect the presence of the biological specimen 103 in the channel 106. In one example, the first volume of pulsatile flow ranges from about 30 μL per pulse to about 300 μL per pulse (preferably greater than about 50 μL per pulse), and the second volume of pulsatile flow ranges from about 1 μL per pulse to about 10 μL per pulse (preferably about 5 μL per pulse). Further, the pulse length for the first volume of pulsatile flow ranges from about 50 milliseconds to about 100 milliseconds, and the pulse length for the second volume of pulsatile flow ranges from about 5 milliseconds to about 25 milliseconds.

In one example, the pump 110 is further configured to provide a second volume of pulsatile flow to the channel 106, where the first volume is greater than the second volume. As discussed above, the first volume of pulsatile flow may be used to dislodge the biological specimen 103 from the needle 101, while the second volume of pulsatile flow may be used to transport the biological specimen 103 through the channel 106 of the fluidic device 100. In another example, as shown in FIG. 1, the pump 110 comprises a first pump, and the fluidic device 100 further includes a second pump 120 in fluid communication with the second inlet 108. The second pump 120 is configured to provide a second volume of pulsatile flow to the channel 106, where the first volume is greater than the second volume. In one such example, the first pump 110 comprises a unidirectional pump, and the second pump 120 comprises a bidirectional pump. The fluidic device 100 may further include a reservoir 122 including an aqueous liquid in fluid communication with the first pump 110 and the second pump 120. In one particular example, the aqueous liquid comprises a physiological buffer or phosphate buffered saline (PBS).

The second volume of pulsatile flow used for transporting the biological specimen 103 is important in that it has a sharp rising (and falling) edge, which means that a short pulse can be effective in reaching peak pressure/flow quickly within the channel 106 of the fluidic device 100. Using pulsatile flow for transporting the biological specimen 103 has advantages in that transport can occur quickly, but the relatively short duration or magnitude of the transport does allow the biological specimen 101 to travel large distances unintentionally. By reducing mechanical compliance in the fluidic device 100 design and construction, careful priming of the fluidic device 100 without introducing highly-compliant air bubbles, and the elimination of unwanted air bubbles can facilitate the transfer of sharp transient pulses into and throughout the fluidic device 100.

The first volume of pulsatile flow is provided by pump 110 at a higher volumetric flow rate around 1000-5000 μL/sec sustained for 50 milliseconds or more. Rise time of pulse ("sharpness") is not important with the first volume of pulsatile flow. The total volume delivered to remove the biological specimen 103 from the needle 100 is around 10-1000× the second volume of pulsatile flow that is used as a single transport "step" to move the biological specimen 103 through the channel 106 once it has been dislodged from the needle 101. As discussed above, either the pump 110 of the second pump 120 is configured to provide a second volume of pulsatile flow to the channel 106, where the first volume is greater than the second volume. In the second volume of pulsatile flow, volumetric flow rate not critical, but short/fast rise time is required to get high Womersley (>10) number that yields "plug flow" (non-parabolic velocity profile). It should be noted that the system compliance influences the rise time (like an "RC" time constant). Total volume per pulse should be small (5 μL) so that the incremental transport step size of the biological specimen 103 is approx. 1 mm. It is also desirable to have a high repetition frequency for the pump that provides the second volume of pulsatile flow, so the transport step can be repeated in a rapid sequence (5-40 Hz).

FIG. 2 illustrates a perspective view of the fluidic device 100, according to an example embodiment. As shown in FIG. 2, the fluidic device 100 includes a second channel 124 in fluid communication with the second inlet 108. The fluidic device 100 further includes a plurality of feeder channels 126A-126E positioned between the second channel 124 and the channel 106. Although five feeder channels 126A-126E are illustrated in FIG. 2, additional or fewer numbers of feeder channels are possible as well. As shown in FIG. 2, each of the plurality of feeder channels 126A-126E may have a different length. In particular, a length of a feeder channel 126A nearest the first inlet 102 is greater than a length of a feeder channel 126E furthest from the first inlet 102. As shown in FIG. 2, in one example the plurality of feeder channels 126A-126E are parallel to one another.

Figure 4A:
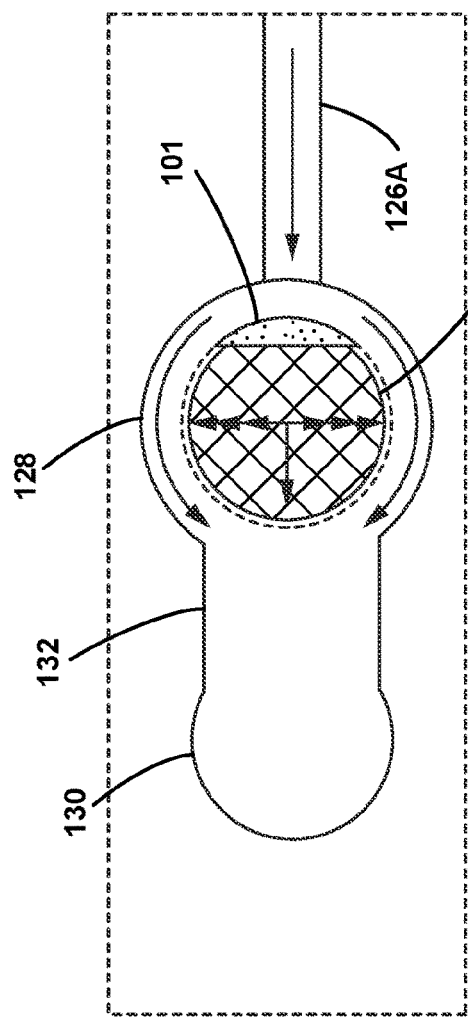
FIGS. 4A-4B illustrates side-view cross-sectional diagrams of a biological specimen on a side-cut needle bed in two different orientations with respect to the fluidic flow for removal, according to example embodiments.
Figure 4B:
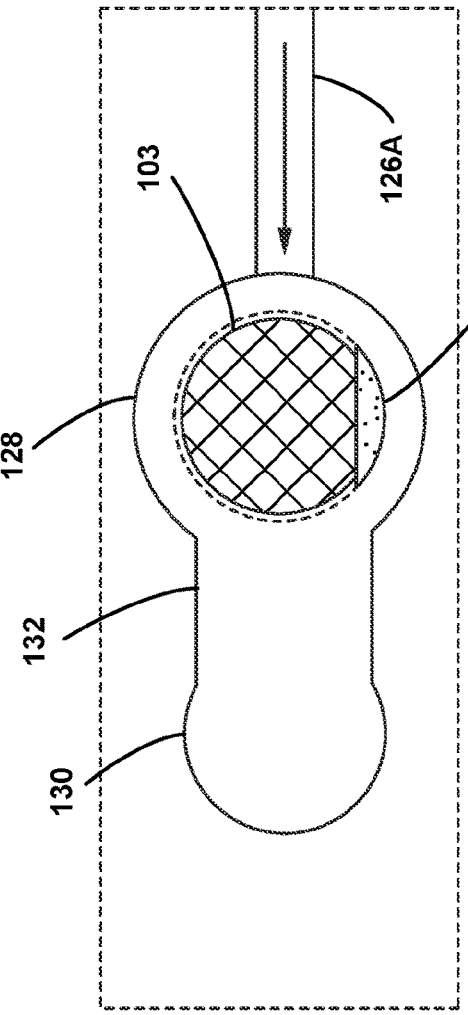

FIGS. 3A-3D illustrate a time series depiction of a removal of a biological specimen from a needle within the fluidic device of FIG. 2. FIGS. 3A-3D illustrate the general principle of the fluidic device 100 in the example case of aa core needle biopsy on a side-cut needle type. High shear fluid flow is directed toward the side of the biological specimen 103 resting on top of the needle substrate, with the plurality of feeder channels 126A-126E delivering fluid of different lengths and hence resistances, such that the fluid velocity is highest at the end of the distal end of needle 101, and lowest at the opposite end. This design is a balance of having numerous smaller channels that produce a smooth gradient of pressure along the biological specimen 103, while having not too many channels that would increase the fluidic resistance and limit the maximum pressure required to controllably move the biological specimen 103. This general principle was observed during the range of fluid velocities (average during pulse) is 100 mm/second up to 640 mm/second, given the geometry of the channels and the pump characteristics. In experimental application, the biological specimen 103 is shown to detach from distal the end of the needle 101 first (e.g., the end further from the first inlet 102 of the fluidic device 100), and subsequent flow aligns the free portion of the biological specimen 103 with the channel 106 for transport, and also provides a pulling force due to fluid drag to pull the biological specimen 103 from the last point of attachment. Note that on both the side-cut and end-cut needle types, the tendency is for the tissue to stick more tenaciously at the end furthest away from the needle tip. This is presumably due to tissue being caught between the sheath of the needle 101 and the internal plunger. Thus, this design of dislodging and directing an elongated specimen from one channel to another channel will be effective for the two main classes of biopsy needles, side-cut and end-cut needles.

Alternative fluidic movement components to the system do not require the transverse fluid flows to be orthogonal to the biopsy surface, but orthogonal to the needle surface. A more tangential fluid flow to the biopsy surface can produce dynamic drag forces from vortex shedding in the milli-fluidic range of Reynolds numbers of roughly 40-1000. Furthermore, the plurality of feeder channels 126A-126E that direct fluid flow to dislodge the biological specimen 103 from the needle 101 do not have to be parallel. For example, alternative feeder channel design would direct more fluid or create a higher degree toward turbulent flow on the areas of the needle 101 that hold the biological specimen 103 more strongly than other regions.

Alternative embodiments of the system incorporate mechanical dynamics, providing movement of the needle 101 to assist in removal of the biopsy from the typically metal needle 101. The needle 101 can be struck or plucked to form a lateral vibration or rotated back and forth along is long axis. The forces can be imparted using an electro-mechanical hammer, stepper motor, and/or piezoelectric acoustic actuator. In another example, the needle 101 may be rotated while flowing the first volume pulsatile fluid flow into the channel 106.

Although FIGS. 3A-3D illustrate a side-cut needle, the fluid flow in the fluidic device 100 shown in FIGS. 3A-3D could also work with an end-cut needle. End-cut needles have their own mechanism for pushing the biopsy out, which is typically a wire of flexible rod fitting to push the biopsy out the distal end. As such, the fluid flow in the fluidic device 100 shown in FIGS. 3A-3D also works with an end-cut needle to help the final detachment of the biopsy at the proximal end of the needle (e.g., the end closest to the first inlet 102) or mechanical pushing device and propelling across the wide channel into the smaller specimen channel. Biopsy removal can be critical for side-cutting needle as well as end-cutting needles, so for all biopsy needles that attempt to take tissue specimens that preserve the general intact state, such as shape and microstructure, without damage that negatively affects making accurate assessments of adequacy and disease diagnosis, as well as determining the type of disease classification, such as cancer phenotype, for future precision medicine and personalized therapies.

By comparing flow rates required for releasing a biological specimen 103 from the needle 101, alternative and unobvious design improvements have been discovered with experimental testing with test modules using pulsatile flows in the milli-fluidic 1-1500 Reynolds number range of flow, with and without the presence of a biological specimen 103 in the channel 106. For example, the side-cut needle 101 may be oriented so that the flow wraps around the biological specimen 103 (shown in FIG. 4A), producing a drag force that is normal to the attachment surface between needle 101 and biological specimen 103. In experimental testing this orientation and biological specimen 103 removal procedure can produce biological specimen 103 detachment with <10% of the flow required by the alterative needle orientation (shown in FIG. 4B). This approach has the additional advantage that when a partial length biological specimen 103 is present, there is less shunting of flow around the biological specimen 103 that does not aid in detachment.

In the arrangement of FIG. 4A, the back of the needle 101 is facing the feeder channels 126A-126E and the biological specimen 103 is facing the channel 106. The outer edge of the biological specimen 103 is exposed top and bottom to the flow that goes over the back of the needle 101 and possible eddy currents help to dislodge the biological specimen 103 from the needle 101. Vibrating the needle 101 and/or rotating the needle 101 back and forth during fluidic flow directed at the needle 101 would help to reduce flow and time for removal. Transient pressure drops between inlet and outlet may be useful for biological specimen 103 removal as well as controlling directed movement within the fluidic device 100, including parking the biological specimen 103 as discussed in additional detail below. Using higher or lower viscosities of fluid can modulate the effects of the fluidic flows and impacted forces on the biological specimen 103.

As discussed above, FIGS. 4A-4B illustrate side-view cross-sectional diagrams of the core needle biopsy on the side-cut needle bed in two different orientations with respect to the fluidic flow for removal. FIG. 4B illustrates the configuration of the side-cut needle 101 shown in FIG. 2, while FIG. 4A illustrates an alternative arrangement of the side-cut needle 101. High efficiency of fluidic flow required to separate the biological specimen 103 from the needle 101 is important since the less force and duration under these forces, then the less likely there is any mechanical or chemical changes to the intact nature of the biological specimen 103. The more rapid removal of the biological specimen 103 from the needle 101 is facilitated from the oscillating vortex shedding phenomenon in the milli-fluidic flow range of roughly 40-1000 in Reynolds number. By averaging across the series of sharp fluidic pulses of flow that remove the core biopsy from a 14 G needle in typically 2 seconds, the calculated range of Reynolds numbers that produce this efficient biopsy removal are 40-300 in a laboratory setting with PBS. This range of Reynolds numbers are considered lower that true values since transient velocities were not calculated, only the average over time required to remove the fresh tissue biopsy.

Figure 5A:
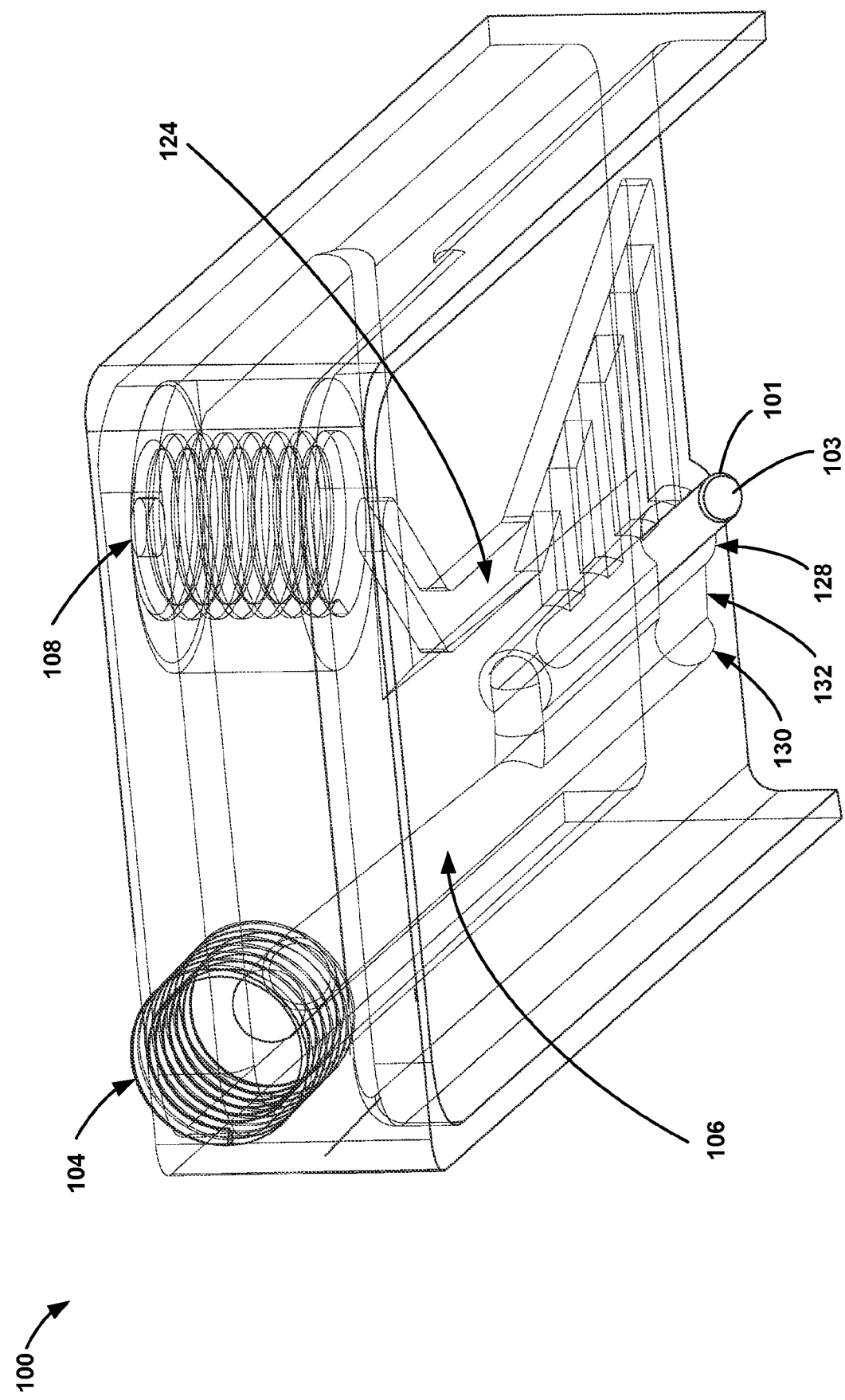
FIG. 5A illustrates a perspective cross-sectional view of the fluidic device, according to an example embodiment.

FIG. 5A illustrates a perspective cross-sectional view of the fluidic device 100, according to an example embodiment. As shown in FIG. 5A, the channel 106 comprises a first portion 128 having a first diameter. The first portion 128 is in fluid communication with the first inlet 102. The channel 106 further comprises a second portion 130 having a second diameter. The second portion 130 is in fluid communication with the outlet 104. The channel 106 further comprises a third portion 132 having a third diameter. The third portion 132 is positioned between the first portion 128 and the second portion 130. In one example, the first diameter is greater than the second diameter, and the second diameter is greater than the third diameter. Further, a length of the first portion 128 and a length of the third portion 132 may be substantially equal, while a length of the second portion 130 is longer than the length of the first portion 128 and the length of the third portion 132. As such, the second portion 130 may comprise the portion of the channel 106 through which the biological specimen 103 travels are separation and dislodgement from the needle 101.

Figure 7:
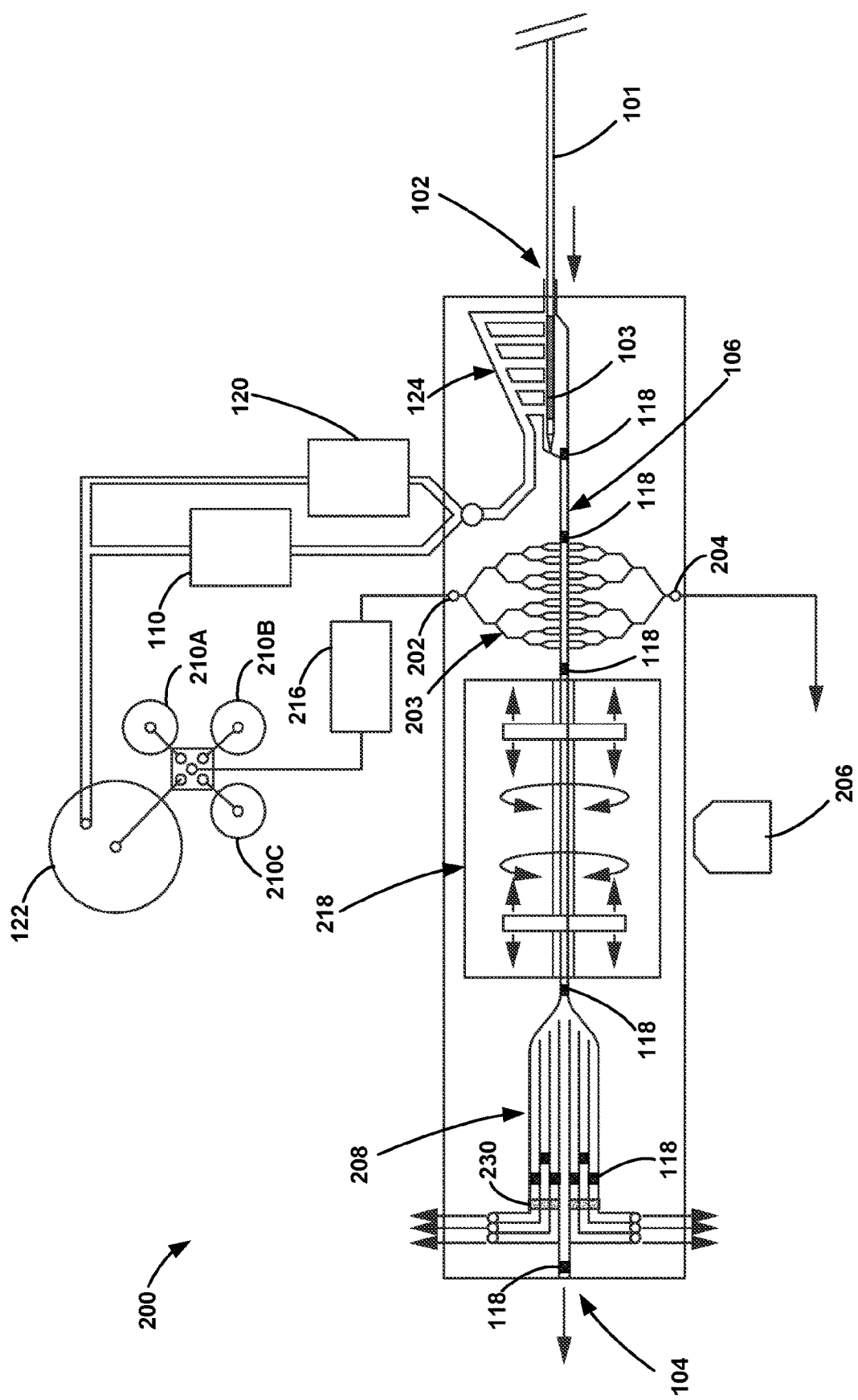
FIG. 7 illustrates a simplified block diagram of a system, according to an example embodiment

As such, in some embodiments of the fluidic device 100, biopsy removal is partially enabled by the two parallel channels of the first portion 128 of the channel 106 (e.g., the needle channel) and the third portion 132 of the channel 106 (e.g., the specimen channel) that are joined for a limited length via the second portion 130 of the channel 106 that creates the widest channel within the fluidic device 100. Typically the specimen channel is smaller in diameter than the needle channel since the side-cutting needles have an external sheath that encompassed the needle and biopsy. Note that in a complete system-on-a-chip as shown in FIG. 7 below, the biopsy removal module along with the other functional modules would be integrated into one whole milli-fluidic system. Such a system can be an assembly of modules that fit together or a single uniform system that is manufactured together at one time. Test modules are conspicuous in that that have threaded tubing connectors at every inlet and outlet, except where the biopsy enters and exists the device.

Figure 5C:
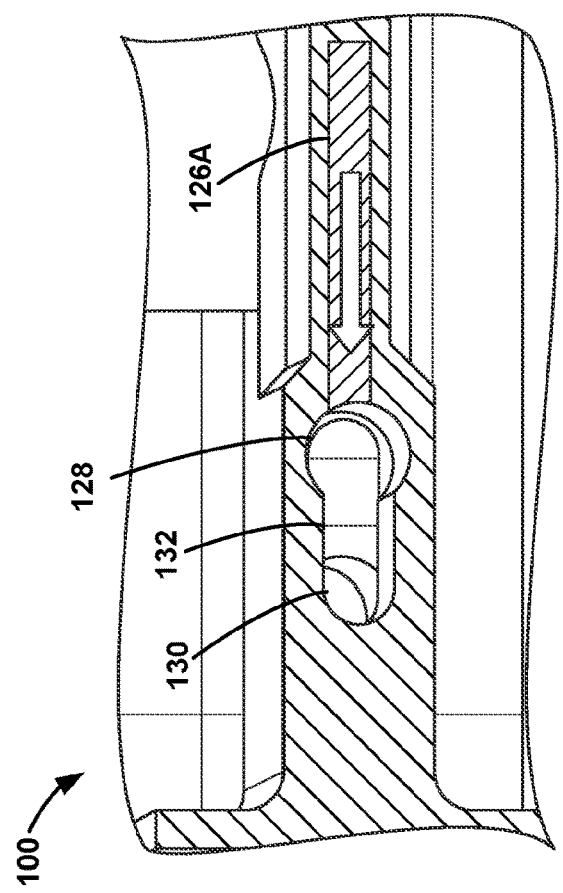
FIGS. 5B-5C illustrate cutaway side views of one of the fluidic device, according to example embodiments.
Figure 5B:
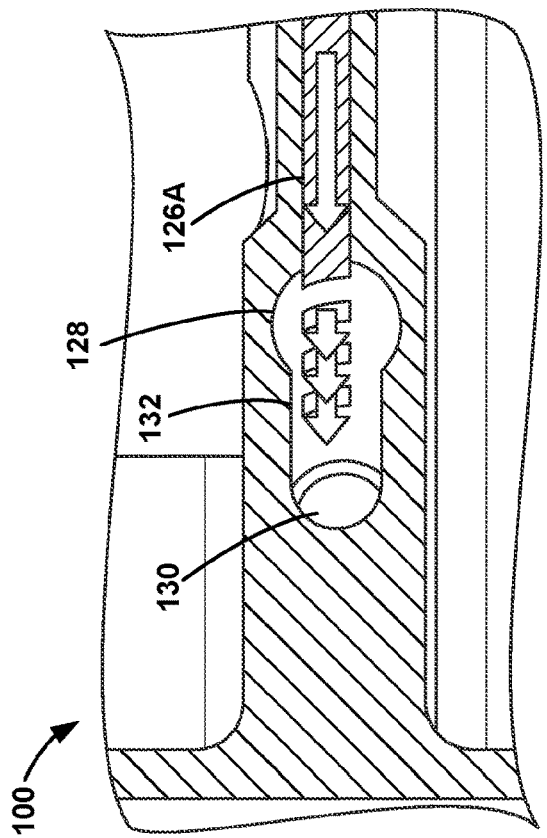

FIGS. 5B-5C illustrate cutaway side views of one of the fluid feeder channels 126A and the channel 106. As discussed above, there may be five feeder channels 126A-126E that focus fluid flow at the side of the biological specimen 103. The channel height is kept relatively small to provide higher fluid velocity for a given volumetric flow rate. In one particular example, the channel height is around 0.7 mm. Ideally the separating walls between the channels are kept minimal to provide directed flow at every point along the length of the biopsy. The first portion 128 of the channel 106 (e.g., the biopsy needle chamber) may be configured to accept a biopsy needle (such as a 14 gauge (G) needle) plus clearance. The first portion 128 of the channel 106 wraps around the needle slightly to retain it, as well as keep flow focused on the biopsy once the biopsy starts to detach from the needle. The third portion 132 of the channel 106 (e.g., the biopsy transport channel) runs parallel to the needle, and is sized to the max biopsy diameter for the needle. In one particular example, the third portion 132 of the channel 106 is sized to the max biopsy diameter of 1.7 mm for a 14 gauge needle. Since biopsy needles range in sizes, typically from 10 to 20 G for core biopsy needles, the biopsy removal stage may require needle insertion channels of different diameters for sealing the fluidic device 100 and having the most efficient fluidic functionality. However the range of biopsy diameters is usually limited for each organ, such as 14 G to 18 G for the kidney of adults and 18 G for pediatrics which should allow for the same fluidic device 100 for the same medical procedure.

Figure 6A:
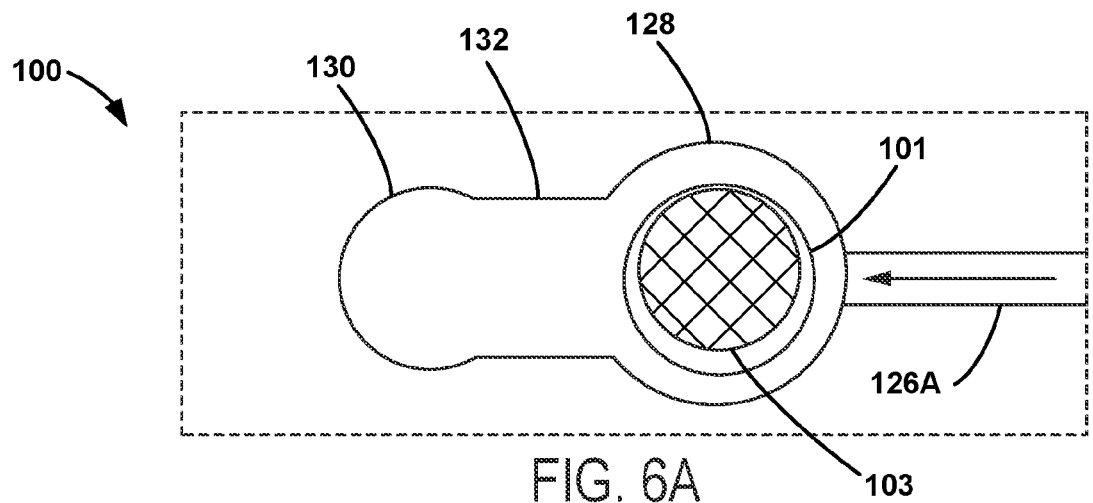
FIGS. 6A-6C illustrate different versions of a feeder channel in cross-sectional view having differing amounts of frictional resistance to flow to the biological specimen using milli-fluidic geometrical features, according to example embodiments.
Figure 6B:
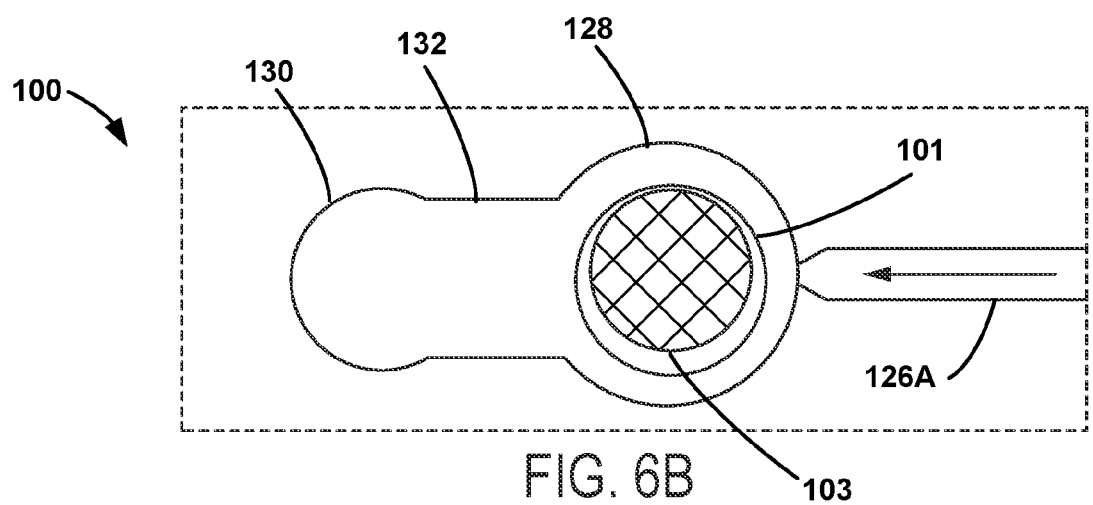
Figure 6C:
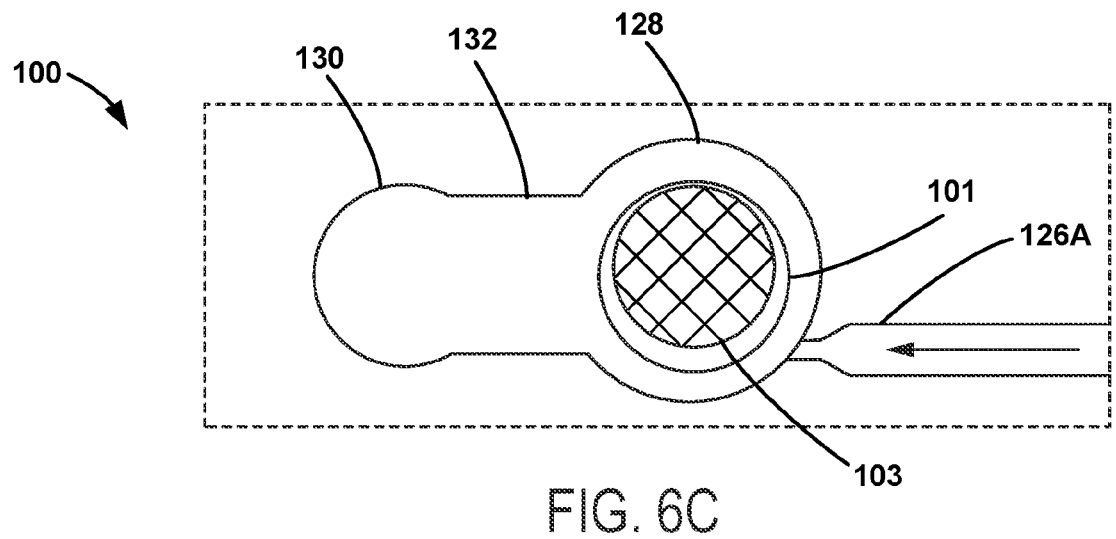

FIGS. 6A-6C illustrate three cross-sectional views of a feeder channel 126A, needle 101, biological specimen 103, and channel 106 having different amounts of fluidic flow resistance. FIG. 6A illustrates flow focused from the side to dislodge the biological specimen 103 from the needle 101. As shown in FIG. 6B, feeder channels that provide shearing flow to the biological specimen can be focused via restriction at end of the feeder channel, which this reduces overall flow resistance but provides higher velocity of flow out the apertures/orifices. Further, as shown in FIG. 6C, placement of the focused flow may be oriented such that flow is directed on the biopsy-needle boundary where adhesion occurs. Chamber design features include a transition area that is sized to the biopsy diameter, and a biopsy transport channel that is slightly larger to include clearances for the biopsy to prevent clogging under lower biopsy transport (not removal) forces.

FIG. 7 illustrates an example system 200, according to an example embodiment. As shown in FIG. 7, the system 200 may include the fluidic device 100 as described in FIGS. 1-6C. The system 200 may further include a third inlet 202 positioned between the second inlet 108 and the outlet 104. The third inlet 202 is in fluid communication with the channel 106. As shown in FIG. 7, the third inlet 202 may comprise a plurality of inlets each in fluid communication with the channel 106. As such, the area in which the third inlet 202 combines with the channel 106 may comprise a location for staining or fixing the biological specimen 103. The system 200 may further include a second outlet 204 positioned between the first inlet 102 and the outlet 104. The system 200 may further include an imaging device 206 positioned adjacent to the channel 106 between the first inlet 102 and the outlet 104.

As shown in FIG. 7, the system 200 may further include a plurality of storage channels 208 in fluid communication with the channel. The plurality of storage channels 208 are positioned between the imaging device 206 and the outlet 104. In one example, the plurality of storage channels 208 are positioned at an angle of about 15 degrees relative to the channel 106. Such an arrangement is illustrated in FIG. 8. Although FIG. 8 illustrates the plurality of storage channels 208 as a standalone modular component, the plurality of storage channels 208 may be incorporated into a unitary system as shown in FIG. 7.

The plurality of storage channels 208 shown in FIGS. 7 and 8 illustrate the concept of multiplexed storage of multiple core needle biopsies. For some biopsy procedures, such as prostate, 12 biopsies may be acquired at one clinical session. A single disposable device can accommodate multiple biopsies by redirecting fluid flow from a central channel to nearby parallel channels using a matrix of valves to switch flow. FIG. 7 illustrates different amounts of biopsy deviation for redirection into a parking space. Whereas FIG. 8 illustrates a branching design approach or "parking tree" configuration that has requires equal amounts lateral deviation of the biopsy for reaching a parking channel. The structure shown in FIG. 8 may be used for testing the parking function as a separate module. The preferred geometry for the parking function in a multifunctional milli-fluidic device may depend on the organ tissue type, needle size, specimen length, and maximum number of biopsies. However, the 15-degree angle off from the main specimen channel in the prototype tree branch structure of FIG. 8 works well with 14 gauge core needle biopsies in laboratory testing using PBS solution.

The operation of the milli-fluidic device in a complete system is shown in FIG. 7, where the entrances to "parking spaces" are offset in this hybrid design. This provides a less abrupt turn required for the biopsy without significantly enlarging the channel diameter/width, thus maintaining controlled transport, in combination with the pulsatile low volume (5 µL pulses) bidirectional pump used for transport, core needle biopsies may be retrieved by reversing direction. After initial processing, they can be moved again into other empty "parking spaces", processed with different stains, imaged again, or simply ejected from the device. FIG. 7 also shows a filter 230 in series with all "parking spaces". Such a filter 230 may be used not only to prevent accidental loss of the biopsy off chip, but also can prevent biological waste from entering the waste fluid (when using a 0.2 micron filter).

As shown in FIG. 7, the system 200 may include one or more sensors 118 configured to detect a presence of a biological specimen 103. In one specific example, the one or more sensors 118 may comprise optical switches, although other types of sensors are possible as well. Not only can the one or more sensors 118 be used to detect when the biological specimen 103 is removed from the needle 101, but by placing sensors throughout the system 200, the one or more sensors 118 can be used to determine the location of the biological specimen 103 at several locations in the system 200 (e.g., when the biological specimen 103 is at a staining location 203, when the biological specimen 103 is at an imaging portion 218, and when the biological specimen 103 is properly positioned in the "parking space" embodied by the storage channel 208, as non-limiting examples).

As shown in FIG. 7, the system may further include one or more reservoirs 210A-210C each in fluid communication with the third inlet 202. The one or more reservoirs 210A-210C may each include a different fluid selected from a group consisting of a staining solution, a fixative, and an optical clearing agent. Further, the reservoir 122 may be in communication with the third inlet 202 as well.

In one example, the pump 110 is configured to pump a fluid from the one or more reservoirs 210A-210C over a biological specimen 103 without moving the biological specimen 103 through the channel 106 (e.g., at the staining location 203 illustrated in FIG. 7). FIG. 9A illustrates a simplified block diagram of an example pump system that would enable the pump 110 to provide such fluid flow. As shown in FIG. 9A, the system further includes a compliant membrane 212 in fluid communication with the pump 110, and a valve 214 in fluid communication with the pump 110 and positioned between the pump 110 and the compliant membrane 212. When the valve 214 is open, the pump 110 acts as a non-pulsatile fluid pump, and when the valve 214 is closed the pump 110 acts as a pulsatile fluid pump. Such an arrangement occurs due to the compliant membrane 212 absorbing the pulses from the pulsatile pump 110, thereby making the pulses less severe when the valve 214 is open and causing the system to act essentially as non-pulsatile flow. Thus, the system 200 may be configured to close the valve 214 when pulsatile flow is desired (e.g., during removal of the biological specimen 103 from the needle 101 and during transport of the biological specimen 103 through the channel), and the system 200 may be configured to open the valve 214 when non-pulsatile flow is desired (e.g., during staining or further processing of the biological specimen 103 without moving the biological specimen 103 through the channel 106.

Figure 9B:
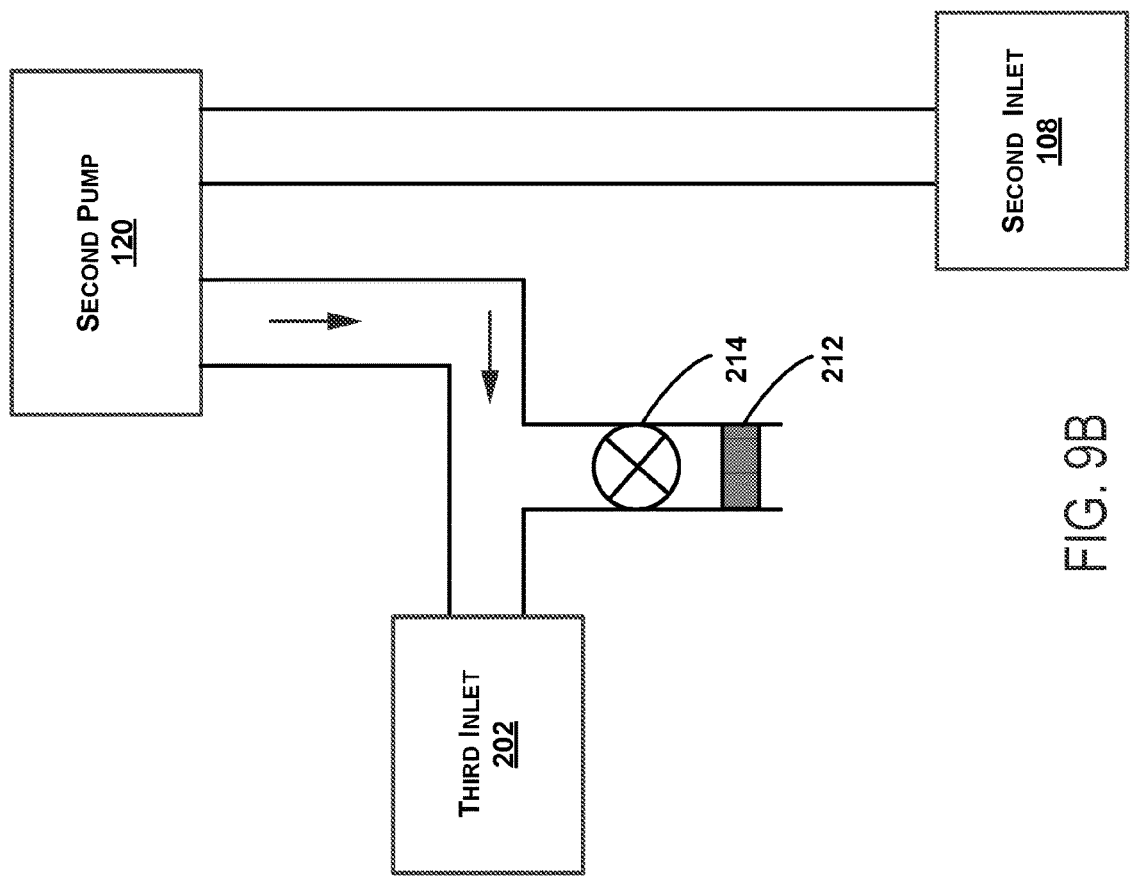
FIG. 9B illustrates a simplified block diagram of another example pump of the system of FIG. 7, according to an example embodiment.
Figure 9A:
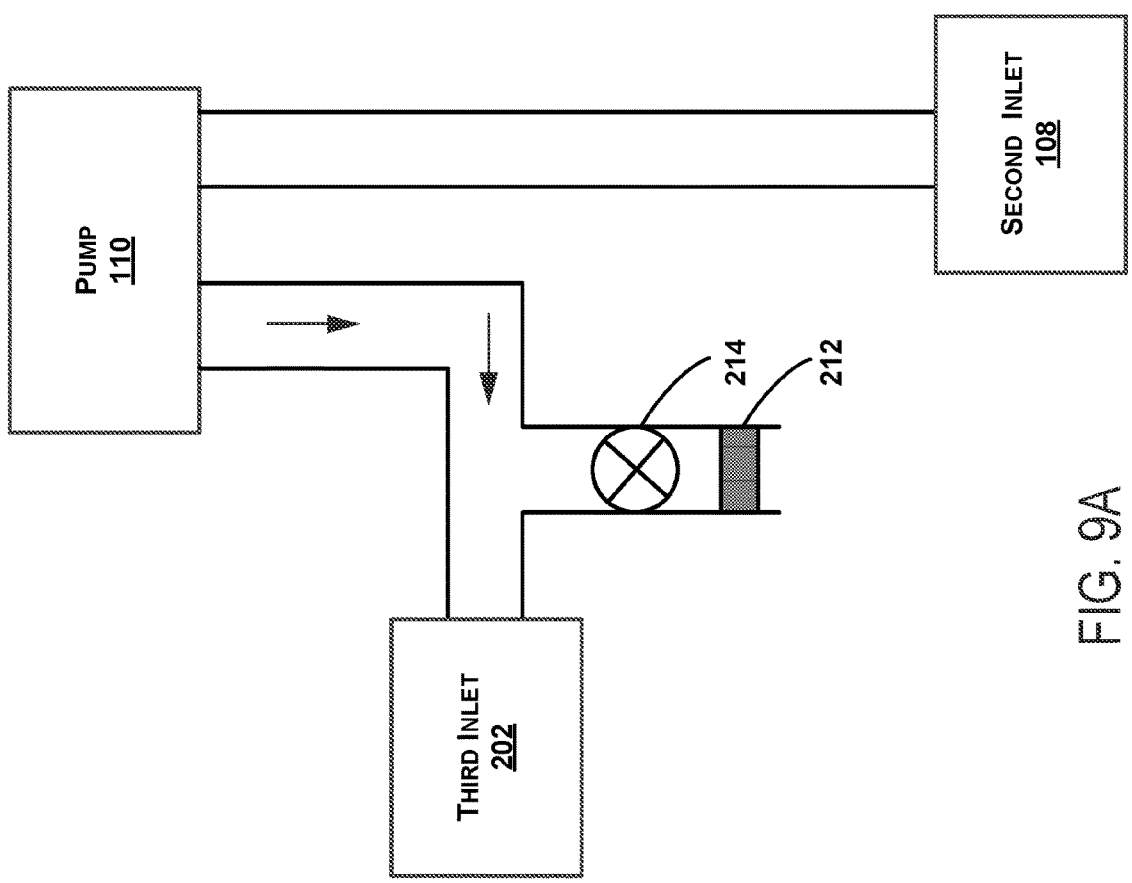
FIG. 9A illustrates a simplified block diagram of an example pump of the system of FIG. 7, according to an example embodiment.

In another example, as shown in FIG. 9B, the pump 110 comprises a first pump, and the fluidic device 100 further includes a second pump 120 in fluid communication with the second inlet 108. In such an arrangement, the first pump 110 is configured to provide the first volume of pulsatile flow to the channel 106 (to dislodge the biological specimen 103 from the needle 101), and the second pump 120 is configured to provide a second volume of pulsatile flow to the channel 106 that is less than the first volume (to transport the biological specimen 103 through the channel 106 of the fluidic device 100). In such an example, as shown in FIG. 9B, the second pump 120 may be further configured to pump a fluid from the one or more reservoirs 210A-210C over a biological specimen 103 without moving the biological specimen 103 through the channel 106 (e.g., at the staining location 203 illustrated in FIG. 7). As such, the second pump 120 may be configured similar to the pump 110 shown in FIG. 9A. In particular, the second pump 120 may include a compliant membrane 212 in fluid communication with the second pump 120, and a valve 214 in fluid communication with the pump 110 and positioned between the second pump 120 and the compliant membrane 212. When the valve 214 is open, the second pump 120 acts as a non-pulsatile fluid pump, and when the valve 214 is closed the second pump 120 acts as a pulsatile fluid pump.

In another example, as shown in FIG. 7, the pump 110 comprises a first pump, and the fluidic device 100 further includes a second pump 120 in fluid communication with the second inlet 108. The second pump 120 is configured to provide a second volume of pulsatile flow to the channel 106 that is less than the first volume. FIG. 7 further illustrates a third pump 216 in fluid communication with the third inlet 202. The third pump 216 comprises a non-pulsatile fluid pump that is configured to pump a fluid from the one or more reservoirs 210A-210C over a biological specimen 103 without moving the biological specimen 101 through the channel 106.

As further shown in FIG. 7, the channel 106 comprises an imaging portion 218 positioned adjacent to the imaging device 206. In one example, as shown in FIGS. 10A-10E, the imaging portion 218 of the channel 106 includes an elastic tube 220 having a first end and a second end in fluid communication with the channel 106. The imaging portion 218 of the channel 106 may further include a first actuator 222 coupled to an outer surface of the elastic tube between the first end and the second end of the elastic tube 220. The imaging portion 218 of the channel 106 may further include a second actuator 224 coupled to the outer surface of the elastic tube 220 between the first actuator 222 and the second end of the elastic tube 220. The first actuator 222 and the second actuator 224 are configured to move apart from one another to transition a portion of the elastic tube 220 positioned between the first actuator 222 and the second actuator 224 from a first condition to a second condition, where a diameter of the portion of the elastic tube 220 positioned between the first actuator 222 and the second actuator 224 is greater in the first condition than in the second condition. The imaging portion 218 of the channel 106 may further include one or more rotatable components 226 coupled to the first actuator 222 and the second actuator 224. The one or more rotatable components 226 are configured such that a rotation of the one or more rotatable components 226 causes the portion of the elastic tube positioned between the first actuator and the second actuator to rotate. The imaging portion 218 of the channel 106 may further include a rigid frame 228 coupled to the elastic tube 220. In one example, the rigid frame 228 comprises an optically clear plastic material.

Figure 10B:
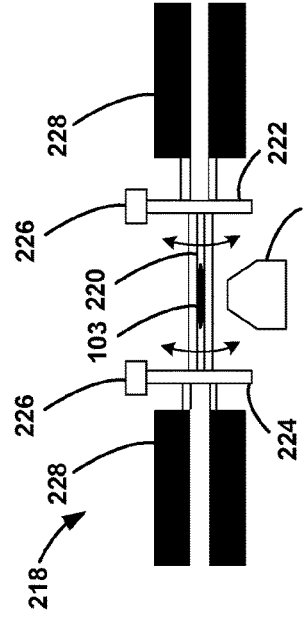
FIG. 10B illustrates a simplified block diagram of the imaging portion of the system of FIG. 10A during staining of a biological sample, according to an example embodiment.
Figure 10D:
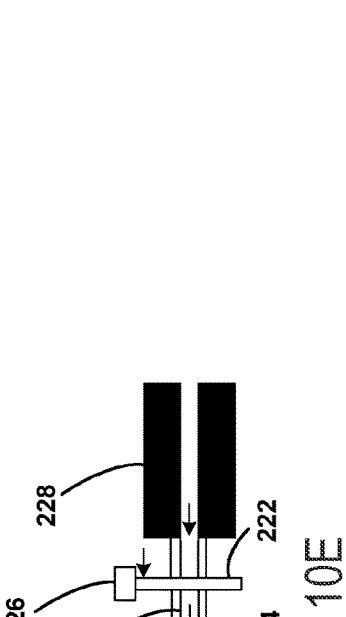
FIG. 10D illustrates a simplified block diagram of the imaging portion of the system of FIG. 10A during rotation of the elastic tube and imaging of the biological sample, according to an example embodiment.
Figure 10E:
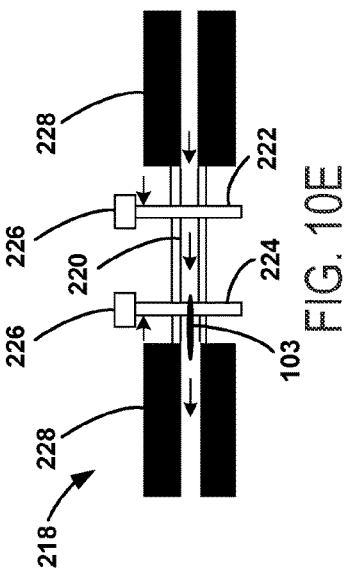
FIG. 10E illustrates a simplified block diagram of the imaging portion of the system of FIG. 10A during releasing and fixing of the biological sample, according to an example embodiment.
Figure 10A:
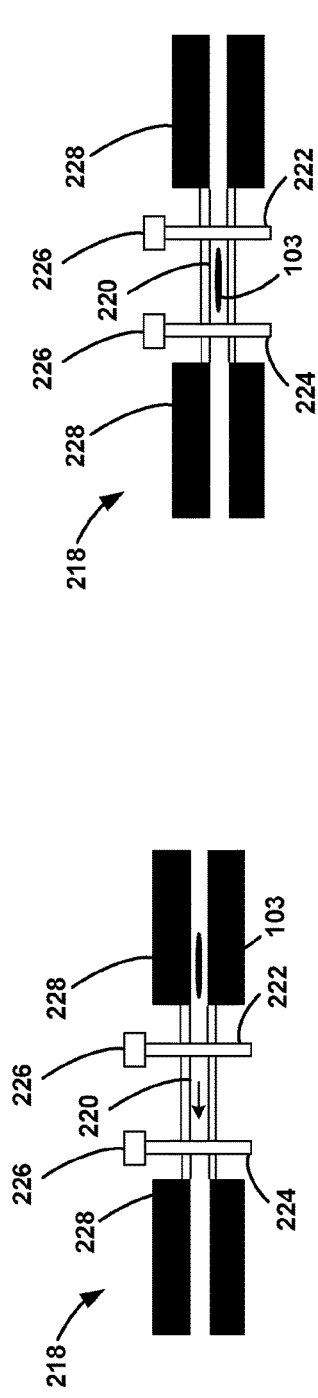
FIG. 10A illustrates a simplified block diagram of an imaging portion of a system during transport of a biological specimen, according to an example embodiment.
Figure 10C:
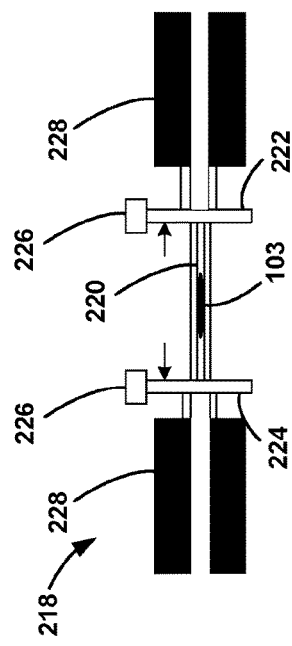
FIG. 10C illustrates a simplified block diagram of the imaging portion of the system of FIG. 10A during axial tension of the elastic tube, according to an example embodiment.

In operation, as shown in FIG. 10A, the biological specimen 103 is transported through the channel 106 to the imaging portion 218 of the channel 106 via pulsatile flow as discussed above. As shown in FIG. 10B, once the biological specimen 103 is positioned in the elastic tube 220, the pulsatile flow may stop to keep the biological specimen 103 stationary in the elastic tube 220. In several embodiments, whether the fluidic device 100 is used for surface imaging or for deeper imaging of the biological specimen 103, the entire cylindrical surface of the biological specimen 103 needs to be rotated during the process of imaging. To accomplish this, the elastic tube 220 may be axially stretched by the actuators 222, 224 which reduces the inner diameter of the elastic tube 220 to gently compress and hold the biological specimen 103, as shown in FIG. 10C. In at least one embodiment, the imaging device 206 (e.g., an objective lens) can be brought up to the surface of the elastic tube 220, as shown in FIG. 10D. During the imaging process, the biological specimen 103 is moved axially so that the entire length of the elongated biological specimen 103 is imaged, and then the biological specimen is rotated a step (such as 5 to 15 degrees depending on the imaging device and resolution required), and then the entire length of the biological specimen 103 is imaged again. This process is repeated until the complete outer cylindrical surface biological specimen 103 has been imaged as a series of axial strips that can be stitched into one mosaic by a computer system recording all camera images from the optical microscope.

In at least one embodiment, the biological specimen 103 can be rotated at least +/−180 degrees in a series of steps, at each axial position of the biological specimen 103 within the microscope working distance and imaging device 206 field of view. After the complete panoramic image of the biological specimen 103 is acquired, the compression holding the biological specimen 103 is released by decreasing the tension on the elastic tube 220 by moving the actuators 222, 224. By restarting the pulsatile flow, the biological specimen 103 will be exited from the imaging portion 218 of the channel 106 and move to other areas of the system 200, as shown in FIG. 10E.

Due to optical scattering, there is an advantage in rotating the biological specimen 103 for 3D imaging as it reduces the maximum depth of imaging (optical path-length in tissue) in half. Rotation also provides advantage in common cases where optical resolution along the optical axis is poorer than the lateral in-plane axes. Furthermore, in several embodiments, the biological specimen 103 can be rotated to provide best in-plane resolution for any feature of interest.

The fluidic device 100 and rapid biological specimen preparation technique lends itself well to Microscopy with Ultraviolet Sectioning Excitation (MUSE) using the MUSE Microscopy system, since the deep UV excitation only penetrates 5-10 microns into the surface of the biological specimen. In several embodiments, the entire outer surface of the (approximately cylindrical) biological specimen 103 can be imaged as the specimen is rotated. Since the cylindrical surface is equal to π times the outer diameter times the length of the biological specimen 103, this is slightly larger in area that the traditional method of taking three thin sections lengthwise of the paraffin-embedded biological specimen to make a cancer diagnosis.

The biopsy removal design of the fluidic device 100 and system 200 described above uses focused fluid flow with a gradient of fluid velocities, such that one end of the biopsy is detached from the needle first, and the subsequent flow aligns and pulls on the biopsy to remove it while maintaining alignment with the channel. Because of the high shear required for some tissues, an air-pressurized fluid bottle may be used to drive the fluid via the pump 110. Further downstream, the fluid flow is gated by a fast-switching solenoid to provide a controlled volumetric pulse. Generally it is best to make this pulse as short as possible (within the confines of the rise/fall times, as they limit how long it takes to reach peak flow rate. Minimizing compliance in the system through use of hard plastics helps). Hard thermoplastics may be best, such as cyclo olefin polymer (CoP) and copolymer (CoC) as they are both mechanically hard and optically transparent, although other materials are possible as well. Thermosetting plastic are another reasonable choice, especially if other desirable features of physical and chemical resistance (low leachables) to sterilization. Other examples of hard and clear plastic materials are polystyrene and Poly (methyl methacrylate) PMMA.

As described above, the biopsy transport method involves use of pulsatile flow in the smallest possible increments (~5 μL is possible) at a high enough fluid shear to overcome stiction and consistently produce incremental motion of the biopsy. Use of bidirectional solenoid pump has proven effective for transporting biopsies in a uniform manner.

As described above, biopsy removal requires higher shear force from fluid flow to remove the biopsy from the needle due to the adhesion of tissue to the biopsy needle. Biopsy transport requires moderate shear force from fluid flow in short volumetric pulses (e.g. a few μL each), such that the fluid flow is above a threshold for consistent biopsy movement. Below a threshold flow rate is desirable for staining and fixation processing so that there is sufficient fluid movement past the biopsy, while this flow rate does not result in biopsy transport. If bubbles need to be dislodged from the milli-fluidic channel or biopsy, then the bubble can be transported to the cross-flow chemical processing stage and a complete range of fluid flows can be used. The flow rate is a general term for fluid flow as volume per time, which can be influenced by the sequence (constant frequency or variable, frequency of pulses) and size of individual pulses. The flow rate striking the biopsy can also be influenced by the number of channels flowing against the surface of the biopsy and their angle of incidence or input, and their removal and output angle.

FIG. 11 is a block diagram of an example method for preparing and transporting a biological tissue sample for pathology. Method 300 shown in FIG. 11 presents an embodiment of a method that could be used by the fluidic device 100 as described in FIGS. 1-6C and/or the system 200 described in FIGS. 7-9, as examples. Method 300 may include one or more operations, functions, or actions as illustrated by one or more of blocks 302-304. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Initially, at block 302, the method 300 includes inserting a needle 101 including a biological specimen 103 into the first inlet 102 of the fluidic device 100 of any one of the embodiments described above so that the needle 101 is positioned at least partially in the channel 106. At block 304, the method 300 includes flowing a first volume of pulsatile flow into the channel 106 via the second inlet 108 to dislodge the biological specimen 103 from the needle 101. As discussed above, the first volume of pulsatile flow may be greater than about 50 µL per pulse.

The method 300 may utilize a biopsy needle with a retractable outer sheath that encompasses the biopsy. The first volume of pulsatile flow comprises a high shear pulsatile flow that is used for detachment of the core needle biopsy from the needle. Tissues like breast fatty tissue have high adhesion, and can require as much as 24 pulses (at 3 Hz rate, pulse duration of 66 milliseconds) of 300 µL volume to dislodge the biopsy. Tissues like kidney tend to have low adhesion, and can be removed with 6-12 pulses of 50 µL each (at 5 Hz, pulse duration of 10 milliseconds). Once inside the fluidic device 100, biopsy adhesion to the channel walls can be reduced by making the inside surfaces hydrophilic using a plasma or UV Ozone surface treatment.

In one example, the method 300 further includes retracting a sheath of the needle 101 prior to flowing the first volume of pulsatile flow. As discussed above, the needle 101 may comprise a side-cut needle or an end-cut needle as non-limiting examples.

In another example, the method 300 further includes (i) acquiring a biopsy via a biopsy needle, (ii) preparing the biopsy for dispensing (e.g., by tensioning the biopsy gun), (iii) inserting the biopsy needle (with the sheath closed) into an inlet of on the fluidic device, (iv) sealing the biopsy needle to the inlet of the fluidic device, (v) priming the fluidic device with an aqueous liquid (e.g., phosphate buffered saline), (vi) retracting the sheath of the biopsy needle to expose the biopsy, (vii) flowing a high shear pulsatile flow over the biopsy via a pump, (viii) monitoring the channel downstream for the biopsy, (ix) in response to detecting the biopsy downstream, switching the pump method to a low shear pulsatile flow, and (x) transporting the biopsy through the channel to a processing chamber or other functional modules of the system via the low shear pulsatile flow.

In another example, the method 300 further includes vibrating, the needle 101 while flowing the first volume of pulsatile fluid flow into the channel 106 and/or rotating the needle 101 while flowing the first volume of pulsatile fluid flow into the channel 106. In one example, the biological specimen 103 is positioned approximately 180 degrees from the first pulsatile fluid flow. Such an arrangement, as discussed above in relation to FIGS. 4A-4B, the needle 101 is oriented so that the flow wraps around the biological specimen 103 (shown in FIG. 4A), producing a drag force that is normal to the attachment surface between needle 101 and biological specimen 103. In experimental testing this orientation and biological specimen 103 removal procedure can produce biological specimen 103 detachment with <10% of the flow required by the alterative needle orientation (shown in FIG. 4B). This approach has the additional advantage that when a partial length biological specimen 103 is present, there is less shunting of flow around the biological specimen 103 that does not aid in detachment.

In another example, the method 300 further includes detecting, via one or more sensors 118, that the biological specimen 103 has been dislodged from the needle 101. The one or more sensors 118 may further be used throughout the system 200 to detect a location of the biological specimen 103 as the specimen travels through the channel 106 after detachment from the needle 101.

In another example, the method 300 further includes flowing a second volume of pulsatile flow into the channel 106 via the second inlet 108 to transport the biological specimen 103 through the channel 106. As discussed above, the first volume of pulsatile flow (e.g., the flow needed to disengage the biological specimen 103 from the needle 101) is greater than the second volume of pulsatile flow (e.g., the flow needed to transport the biological specimen 103 through the channel 106). In one example, the second volume of pulsatile flow is provided by the same pump 110 that is used to provide the first volume of pulsatile flow. In another example, the second volume of pulsatile flow is provided by a second pump 120 that is distinct from the pump 110.

In another example, the method 300 further includes (i) transporting, via the second volume of pulsatile flow, the biological specimen 103 to a position within the channel 106, and (ii) providing a liquid dye, a liquid fixative, and/or an optical clearing agent to contact the biological specimen 103, wherein a flow rate of the liquid dye, the liquid fixative, and/or the optical clearing agent is less than a threshold flow rate, and wherein the biological specimen 103 is substantially stationary when the flow rate is less than the threshold flow rate.

In another example, the method 300 further includes transporting, via the second volume of pulsatile flow, the biological specimen 103 to one of a plurality of storage channels 208 in fluid communication with the channel 106. In such an example, the method may further include (i) inserting the needle 101 including a second biological specimen into the first inlet 102 of the fluidic device 100 so that the needle 101 is positioned at least partially in the channel 106, (ii) flowing a first volume of pulsatile fluid flow into the channel 106 via the second inlet 108 to dislodge the second biological specimen from the needle 101, and (iii) flowing a second volume of pulsatile fluid flow into the channel 106 via the second inlet 108 to transport the second biological specimen through the channel 106. As such, the plurality of storage channels 208 enable multiple biological specimen to be stored, analyzed, and transported through the channel 106 of the fluidic device 100 at one time.

In another example, the method 300 further includes (i) determining that the biological specimen 103 has been dislodged from the needle 101, and (ii) in response to the determination, flowing a second volume of pulsatile flow into the channel 106 via the second inlet 108 to transport the biological specimen 103 through the channel 106, wherein the first volume is greater than the second volume. The determination that the biological specimen 103 has been dislodged from the needle 101 may be made via one or more sensors, via a change in pressure in the channel 106, or via some other means.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses (and any combination of the clauses) further describe aspects of the present description.

We claim:

1. A fluidic device comprising:
   a first inlet;
   an outlet;
   a channel positioned between the first inlet and the outlet, wherein the channel is in fluid communication with the first inlet and the outlet;
   a second inlet positioned between the first inlet and the outlet, wherein the second inlet is in fluid communication with the channel; and
   a pump in fluid communication with the second inlet, wherein the pump is configured to provide a first volume of pulsatile flow to the channel towards a side of a first biological specimen to dislodge the first biological specimen from a first needle positioned at least partially in the channel, and wherein the first volume of pulsatile flow is greater than about 50 μL per pulse.

2. The fluidic device of claim 1, wherein the channel comprises:
   a first portion having a first diameter, wherein the first portion is in fluid communication with the first inlet;
   a second portion having a second diameter, wherein the second portion is in fluid communication with the outlet; and
   a third portion having a third diameter, wherein the third portion is positioned between the first portion and the second portion.

3. The fluidic device of claim 2, wherein the first diameter is greater than the second diameter, and wherein the second diameter is greater than the third diameter.

4. The fluidic device of claim 2, wherein a length of the first portion and a length of the third portion are substantially equal, and wherein a length of the second portion is longer than the length of the first portion and the length of the third portion.

5. The fluidic device of claim 1, further comprising:
   a second channel in fluid communication with the second inlet; and
   a plurality of feeder channels positioned between the second channel and the channel, wherein each of the plurality of feeder channels have a different length, and wherein a length of a feeder channel nearest the first inlet is greater than a length of a feeder channel furthest from the first inlet.

6. The fluidic device of claim 1, wherein the pump is configured to provide a second volume of pulsatile flow to the channel, and wherein the first volume is greater than the second volume.

7. The fluidic device of claim 1, wherein the pump comprises a first pump, the fluidic device further comprising:
   a second pump in fluid communication with the second inlet, wherein the second pump is configured to provide a second volume of pulsatile flow to the channel, and wherein the first volume is greater than the second volume, wherein the first pump comprises a unidirectional pump, and wherein the second pump comprises a bidirectional pump.

8. A system comprising:
   the fluidic device of claim 1;
   a third inlet positioned between the second inlet and the outlet, wherein the third inlet is in fluid communication with the channel;
   a second outlet positioned between the first inlet and the outlet; and
   an imaging device positioned adjacent to the channel between the first inlet and the outlet.

9. The system of claim 8, further comprising:
   a plurality of storage channels in fluid communication with the channel, wherein the plurality of storage channels are positioned between the imaging device and the outlet.

10. The system of claim 9, wherein the plurality of storage channels are positioned at an angle of about 15 degrees relative to the channel.

11. The system of claim 8, further comprising one or more reservoirs each in fluid communication with the third inlet, wherein the one or more reservoirs include a different fluid selected from a group consisting of a staining solution, a fixative, and an optical clearing agent, and wherein the pump is configured to pump a fluid from the one or more reservoirs over the first biological specimen without moving the first biological specimen through the channel.

12. The system of claim 11, further comprising:
a compliant membrane in fluid communication with the pump; and
a valve in fluid communication with the pump and positioned between the pump and the compliant membrane, wherein when the valve is open the pump acts as a non-pulsatile fluid pump, and wherein when the valve is closed the pump acts as a pulsatile fluid pump.

13. The system of claim 11, wherein the pump comprises a first pump, the fluidic device further comprising a second pump in fluid communication with the second inlet, wherein the second pump is configured to provide a second volume of pulsatile flow to the channel, and wherein the first volume is greater than the second volume, and wherein the second pump is configured to pump a fluid from the one or more reservoirs over the first biological specimen without moving the first biological specimen through the channel.

14. The system of claim 13, further comprising:
a compliant membrane in fluid communication with the second pump; and
a valve in fluid communication with the second pump and positioned between the second pump and the compliant membrane, wherein when the valve is open the second pump acts as a non-pulsatile fluid pump, and wherein when the valve is closed the second pump acts as a pulsatile fluid pump.

15. The system of claim 8, wherein the channel comprises an imaging portion positioned adjacent to the imaging device, and wherein the imaging portion of the channel comprises:
an elastic tube having a first end and a second end;
a first actuator coupled to an outer surface of the elastic tube between the first end and the second end of the elastic tube;
a second actuator coupled to the outer surface of the elastic tube between the first actuator and the second end of the elastic tube, wherein the first actuator and the second actuator are configured to move apart from one another to transition a portion of the elastic tube positioned between the first actuator and the second actuator from a first condition to a second condition, and wherein a diameter of the portion of the elastic tube positioned between the first actuator and the second actuator is greater in the first condition than in the second condition; and
one or more rotatable components coupled to the first actuator and the second actuator, wherein the one or more rotatable components are configured such that a rotation of the one or more rotatable components causes the portion of the elastic tube positioned between the first actuator and the second actuator to rotate.

16. A method comprising:
inserting the first needle including the first biological specimen into the first inlet of the fluidic device of claim 1 so that the first needle is positioned at least partially in the channel; and
flowing the first volume of pulsatile flow into the channel via the second inlet to dislodge the first biological specimen from the first needle.

17. The method of claim 16, further comprising:
flowing a second volume of pulsatile flow into the channel via the second inlet to transport the first biological specimen through the channel, wherein the first volume is greater than the second volume.

18. The method of claim 17, further comprising:
transporting, via the second volume of pulsatile flow, the first biological specimen to a position within the channel; and
providing a liquid dye, a liquid fixative, and/or an optical clearing agent to contact the first biological specimen, wherein a flow rate of the liquid dye, the liquid fixative, and/or the optical clearing agent is less than a threshold flow rate, and wherein the first biological specimen is substantially stationary when the flow rate is less than the threshold flow rate.

19. The method of claim 17, further comprising:
transporting, via the second volume of pulsatile flow, the first biological specimen to one of a plurality of storage channels in fluid communication with the channel;
inserting a second needle including a second biological specimen into the first inlet of the fluidic device so that the second needle is positioned at least partially in the channel;
flowing a third volume of pulsatile fluid flow into the channel via the second inlet to dislodge the second biological specimen from the second needle; and
flowing a fourth volume of pulsatile fluid flow into the channel via the second inlet to transport the second biological specimen through the channel.

20. The method of claim 16, further comprising:
determining that the first biological specimen has been dislodged from the first needle; and
in response to the determination, flowing a second volume of pulsatile flow into the channel via the second inlet to transport the first biological specimen through the channel, wherein the first volume is greater than the second volume.

* * * * *